Patented Nov. 13, 1951

2,575,316

UNITED STATES PATENT OFFICE 2,575,316

PROCESS FOR THE PRODUCTION OF PHOSPHORUS SULFOCHLORIDE

Heinz Jonas and Werner Thraum, Leverkusen, Germany, assignors to Farbenfabriken Bayer, Leverkusen, Germany, a manufacturing and trading organization of Germany No Drawing. Application December 27, 1950, Serial No. 203,002. In Germany November 16, 1948

4 Claims. (Cl. 23—14)

The present invention relates to the production of phosphorus sulfochloride ($PSCl_3$).

Until now phosphorus sulfochloride is prepared by heating equimolecular quantities of phosphorus trichloride and sulfur to temperatures above 130° C., preferably 180° C. Thereby it is necessary to carry out the process in the liquid phase in a closed vessel while applying superatmospheric pressure. At lower temperatures the sulfur is not taken up by the phosphorus trichloride.

Owing to these difficult reaction conditions it has therefore been proposed to carry out the reaction between phosphorus trichloride in the vapor phase and liquid sulfur at a temperature of between about 150–180° C. and subsequently separate the reaction products by distillation. Since the reaction proceeds only incompletely it is necessary to use voluminous apparatuses.

It is also known to react phosphorus trichloride and sulfur at relatively lower temperatures in the presence of alkali, alkali metal sulfides and polysulfides respectively. But this reaction takes a very long time until it is complete. For this reason it cannot be used technically, not to mention the rapid consumption of catalyst used.

In accordance with the present invention it has been found that the reaction between phosphorus trichloride and sulfur in the liquid phase can be carried out quickly at temperatures lower than 130° C. and in consequence thereof at lower pressure, by reacting the mixture of the reaction components in the presence of activated carbon. The reaction temperature in that case can be kept so low that operating without superatmospheric pressure in an open vessel is possible. It is particularly advantageous to carry out the reaction at the boiling temperature under atmospheric pressure, while refluxing.

Practically any commercial activated carbon can be used as catalyst. The use of activated carbon having been activated under reducing conditions by means of potassium sulfide is especially advantageous. Even in the reaction mixture itself the action of the carbon is considerably increased by the addition of reducing substances, such as small quantities of elementary phosphorus.

It is of advantage to add phosphorus sulfochloride or the finished reaction product of a previous batch to the reaction mixture right from the beginning in order to increase the boiling temperature and therewith the solubility of the sulfur. If the reaction mixture contains about 40 mol per cent of phosphorus sulfochloride the total quantity of sulfur necessary for performing the reaction is dissolved. It is also advantageous to use an excess of sulfur in order to completely convert the phosphorus trichloride. Under these circumstances reaction between phosphorus trichloride and sulfur is complete within a few hours. The completion of formation of phosphorus sulfochloride can be determined from the boiling point of the liquid which rises from about 80° C. when starting the process until the readily volatile phosphorus trichloride has disappeared up to at least 125° C., being the boiling point of the phosphorus sulfochloride. The yield is an almost quantitative one.

The invention is further illustrated by the following example without being restricted thereto, the parts being by weight:

Example

A solution consisting of 45 parts of sulfur in 137 parts of phosphorus trichloride and 150 parts of phosphorus sulfochloride is heated to boiling under reflux with 6 parts of absolutely dry finely powdered carbon activated by means of potassium sulfide. After three hours the boiling temperature has risen to 125° C. By subsequent distillation of the reaction mixture 165 parts of the pure product are obtained beside the phosphorus sulfochloride used when starting the reaction. It is just as well to add another portion of phosphorus trichloride and sulfur in stoichiometrical proportion to the residue after 165 parts of phosphorus sulfochloride have been distilled off, thus producing a new batch.

When processing under the same conditions but without the addition of activated carbon, the boiling temperature rises only slightly beyond the initial temperature of about 90° C., even after days.

We claim:

1. In a process of preparing phosphorus sulfochloride ($PSCl_3$), by reacting phosphorus trichloride with sulfur, the step which comprises heating a mixture of phosphorus trichloride and sulfur in the presence of activated carbon.

2. In a process of preparing phosphorus sulfochloride (PSCl$_3$), by reacting phosphorus trichloride with sulfur, the step which comprises heating a mixture of phosphorus trichloride and sulfur in the presence of activated carbon to a temperature between about 80° C. and about 125° C.

3. In a process of preparing phosphorus sulfochloride (PSCl$_3$), by reacting phosphorus trichloride with sulfur, the step which comprises heating a mixture of phosphorus sulfochloride (PSCl$_3$), phosphorus trichloride and sulfur in the presence of activated carbon.

4. In a process of preparing phosphorus sulfochloride (PSCl$_3$), by reacting phosphorus trichloride with sulfur, the step which comprises heating a mixture of phosphorus sulfochloride (PSCl$_3$), phosphorus trichloride and sulfur in the presence of activated carbon to a temperature of between about 80° C. to about 125° C.

HEINZ JONAS.
WERNER THRAUM.

No references cited.